United States Patent
Koo et al.

(10) Patent No.: US 10,636,362 B2
(45) Date of Patent: Apr. 28, 2020

(54) RADIO FREQUENCY SIGNAL EMISSION INDUCED DISPLAY ARTIFACT MITIGATION SYSTEMS AND METHODS

(71) Applicant: Apple Inc., Cupertino, CA (US)

(72) Inventors: Kyung Hoae Koo, San Jose, CA (US); Weijun Yao, Saratoga, CA (US); Yue Jack Chu, San Jose, CA (US); Kaige Sun, Campbell, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 16/048,217

(22) Filed: Jul. 27, 2018

(65) Prior Publication Data

US 2019/0311680 A1    Oct. 10, 2019

Related U.S. Application Data

(60) Provisional application No. 62/655,037, filed on Apr. 9, 2018.

(51) Int. Cl.
  *G09G 3/3266*    (2016.01)
  *H04B 5/00*     (2006.01)

(52) U.S. Cl.
  CPC ... *G09G 3/3266* (2013.01); *G09G 2320/0209* (2013.01); *G09G 2320/0257* (2013.01); *G09G 2330/06* (2013.01); *G09G 2340/0435* (2013.01); *H04B 5/0025* (2013.01)

(58) Field of Classification Search
  CPC ......... G09G 3/3266; G09G 2320/0209; G09G 2320/0257; G09G 2330/06
  See application file for complete search history.

(56) References Cited

U.S. PATENT DOCUMENTS

| | | | |
|---|---|---|---|
| 9,560,473 B2 | 1/2017 | Tsai | |
| 9,620,064 B2 | 4/2017 | Albrecht et al. | |
| 2015/0289083 A1* | 10/2015 | Tsai | H04B 5/00 455/41.1 |
| 2016/0078798 A1 | 3/2016 | Watanabe et al. | |
| 2017/0047027 A1 | 2/2017 | Nambi et al. | |
| 2017/0186283 A1 | 6/2017 | Beatty | |
| 2017/0352322 A1 | 12/2017 | Spence et al. | |
| 2018/0033378 A1 | 2/2018 | Li et al. | |
| 2018/0053284 A1 | 2/2018 | Rodriguez et al. | |

\* cited by examiner

*Primary Examiner* — Kent W Chang
*Assistant Examiner* — Chayce R Bibbee
(74) *Attorney, Agent, or Firm* — Fletcher Yoder, P.C.

(57) ABSTRACT

Display artifacts, such as muras, may be perceptible on an electronic display when an electronic device includes a radio frequency transceiver that outputs electromagnetic waves during an emission period and a display panel that writes to display pixels during a refresh period. The electronic device may also include a controller that is coupled to the radio frequency transceiver and the display panel and facilitates the reduction and/or elimination of overlap between the emission periods and the refresh periods to decrease the appearance of display artifacts. In particular, the controller may execute instructions to determine the duration of the emission period and determine the duration of the blanking period that occurs between the refresh periods. Further, based on the determined blanking period and emission period durations, the controller may instruct the radio frequency transceiver to adjust the timing of the first emission period, instruct the display panel to adjust the timing of the refresh rate, or both to reduce overlap.

25 Claims, 8 Drawing Sheets

RADIO FREQUENCY SIGNAL EMISSION INDUCED DISPLAY ARTIFACT MITIGATION SYSTEMS AND METHODS

CROSS REFERENCE TO RELATED APPLICATIONS

This application claims the benefit of U.S. Provisional Application No. 62/655,037, entitled "Radio Frequency Signal Emission Induced Display Artifact Mitigation Systems and Methods," filed Apr. 9, 2018, which is incorporated herein by reference in its entirety for all purposes.

BACKGROUND

The present disclosure relates generally to interactions between radio frequency signals, such as near-field communication (NFC) waves, and an electronic display. More particularly, the present disclosure relates generally to reducing perceivability of display artifacts (e.g., muras) that may arise due to interactions between the radio frequency signal and display pixels of an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information (e.g., text, still images, video) based on corresponding image content. For example, such electronic devices may include computers, mobile phones, portable media devices, virtual-reality headsets, and vehicle dashboards, among many others. In any case, to display an image, an electronic display may control light emission (e.g., luminance) of its display pixels based at least in part on corresponding image data. Additionally, in some instances, luminance of a display pixel may vary based at least in part on electrical energy stored in the display pixel. Thus, to control light emission from a display pixel, the electronic display may supply a data (e.g., analog electrical) signal to the display pixel based at least in part on corresponding image data and instruct the display pixel to store electrical energy based at least in part on the data signal, thereby writing (e.g., refreshing) the display pixel.

Electronic devices may also often include radio frequency transceivers that may output a radio frequency signal to another device. For example, a near-field communication (NFC) module (e.g., device) may facilitate communication with other NFC devices, such as a passive NFC tag and/or an active NFC reader. When operating as an active NFC reader, the NFC module may enable contactless communication between a corresponding electronic device and a passive NFC tag. To facilitate reducing implementation associated cost, passive NFC tags often do not operate using a dedicated power source (e.g., battery). Instead, a passive NFC tag may operate using electrical energy received via electromagnetic (e.g., NFC) waves, for example, wirelessly transmitted from an active NFC reader. However, the electromagnetic waves may affect the image data signal and/or electrical energy stored in one or more display pixels (e.g., charge stored on a storage capacitor during refreshing of display pixels) and, thus, resulting luminance, which, at least in some instances, may be perceivable as a visual artifact.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to mitigating display artifacts arising from interactions between radio frequency signals, such as near-field communication (NFC) electromagnetic waves, and an electronic display by controlling the emission of the radio frequency signals relative to refresh periods of the electronic display. In one example, an NFC module (e.g., device) within a device may be used by the device for contactless communication at short distances with another NFC device (e.g., tag). In some instances, overlap between an emission period of the NFC electromagnetic waves and a refresh period of the electronic display may result in perceivable artifacts, such as muras, for example, due to the NFC electromagnetic waves' effect on electrical energy stored in one or more display pixels and, thus, perceived luminance.

To facilitate improving perceived image quality, in some embodiments, timing of the emission period of NFC electromagnetic waves and/or timing of the refresh period may be adjusted to reduce likelihood of the NFC electromagnetic waves affecting perceived luminance of the display pixels. For example, timing of the emission periods for the NFC electromagnetic waves may be adjusted to facilitate reducing amount of overlap between the emission periods and the electronic display refresh periods. Additionally or alternatively, refresh rate of the electronic display may be adjusted (e.g., reduced) to facilitate reducing amount of overlap by adjusting (e.g., increasing) duration of a blanking period that occurs between refresh periods of the electronic display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
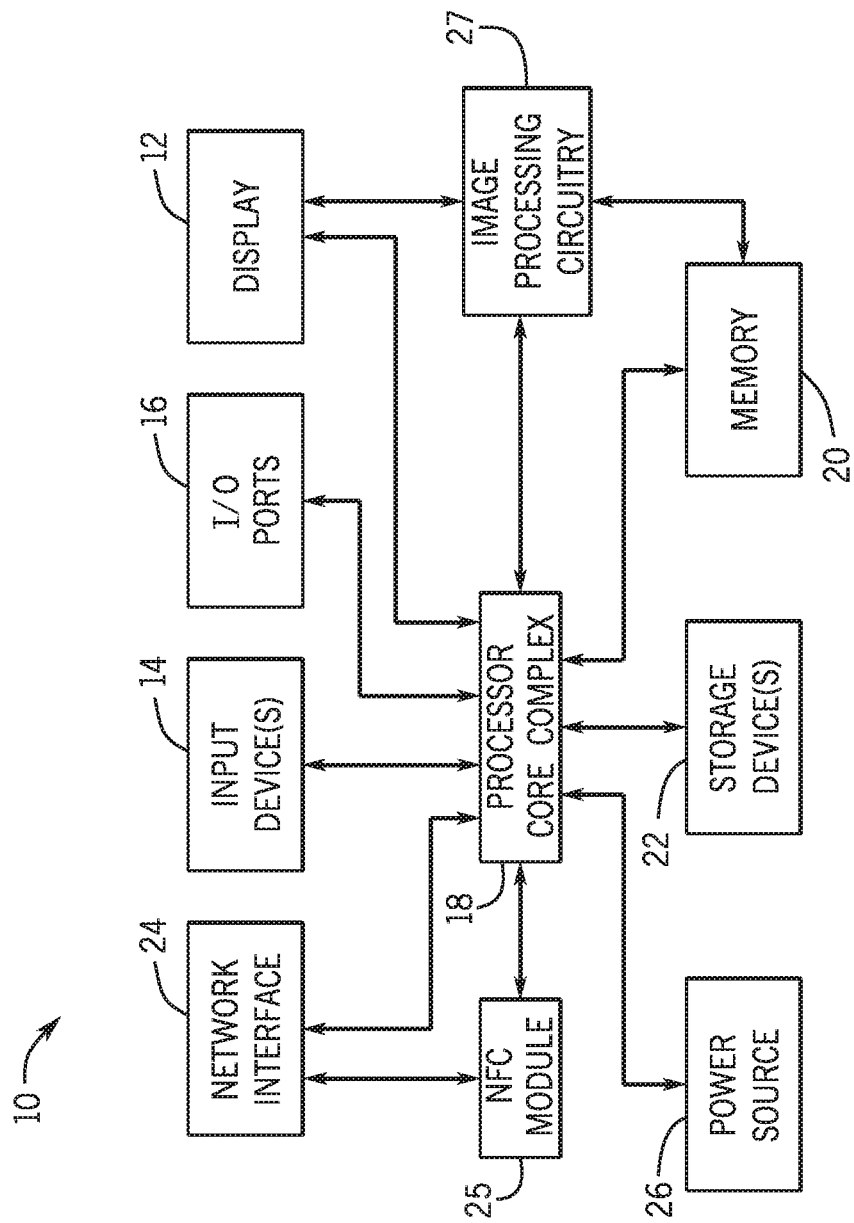
FIG. 1 is a block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency signals, such as near-field communication (NFC) signals, and electronic displays, which may be implemented to present visual representations of information, for example, in one or more image frames. Generally, an electronic display may display an image by controlling light emission and, thus, perceived (e.g., actual) luminance of its display pixel based at least in part on corresponding image data. In some electronic displays, light emission from a display pixel may vary based at least in part on electrical energy stored in the display pixel. For example, in a liquid crystal display (LCD), electrical energy may be stored in the pixel electrode of a display pixel to produce an electric field between the pixel electrode and a common electrode, which controls orientation of liquid crystals and, thus, light emission from the display pixel. Additionally, in an organic light-emitting diode (OLED) display, electrical energy may be stored in a storage capacitor of a display pixel to control electrical power (e.g., current) supplied to a self-emissive component (e.g., OLED) and, thus, light emission from the display pixel.

In some instances, image data may digitally indicate target luminance of display pixels for displaying an image on an electronic display. Since based on stored electrical energy, the electronic display may write a display pixel by supplying an analog electrical (e.g., data) signal based at least in part on corresponding image data to the display pixel and instructing the display pixel to adjust electrical energy stored in its storage component (e.g., pixel electrode or storage capacitor) based at least in part the analog electrical signal. For example, to write an LCD display pixel, a data driver may output a data (e.g., source) signal and a scan driver may output a scan (e.g., gate) signal, which instructs the display pixel to supply the data signal to its pixel electrode. Additionally, to write an OLED display pixel, a data driver may output a data signal and a scan driver may output a scan control signal, which instructs the display pixel to supply the data signal to its storage capacitor.

Additionally, a radio frequency (RF) communication device, such as a near-field communication (NFC) module or RF transceiver may be implemented in an electronic device to enable the electronic device to wirelessly communicate with another electronic device. Examples include standalone near-field communication (NFC) devices and/or another near-field communication module implemented in another electronic device, but could also include radio frequency identification (RFID) tags. Generally, near-field communication devices may wirelessly communicate data (e.g., information) via electromagnetic (e.g., radio frequency) waves. To facilitate wirelessly communicating data, a near-field communication device may include an antenna. For example, to facilitate wirelessly transmitting data, the antenna may output electromagnetic waves with amplitude, phase, and/or frequency of the electromagnetic wave modulated based at least in part on an analog electrical signal that indicates the data. On the other hand, to facilitate receiving wirelessly transmitted data, the antenna may output an analog electrical signal generated based at least in part on electromagnetic waves modulated to indicate the data.

In some instances, a near-field communication device may be implemented to operate as a passive NFC tag, an active NFC reader, or selectively in either a passive NFC tag mode or an active NFC reader mode. To facilitate reducing implementation associated cost (e.g., component count and/or physical footprint), in some instances, a passive NFC tag may be implemented with a limited power source, for example, compared to an active NFC reader. As such, to enable wirelessly transmitting data, a passive NFC tag may be paired with an active NFC reader that supplies it electrical energy.

In some instances, an active NFC reader (e.g., NFC module operating in an active NFC reader mode) may supply electrical energy to a passive NFC tag (e.g., NFC module operating in a passive NFC tag mode) via electromagnetic (e.g., radio frequency) waves. In particular, electromagnetic waves may induce voltage and/or current in an antenna of the passive NFC tag, thereby enabling the antenna to output electrical power that may be stored in the passive NFC tag (e.g., via an inductor and/or a capacitor) as electrical energy and, thus, used to power subsequent operation of the passive NFC tag. For example, the passive NFC tag may utilize the electrical energy to power wireless transmission of data back to the active NFC reader, determination of additional (e.g., measurement and/or sensor) data, storage of the data in memory, and/or retrieval of the data from memory.

However, at least in some instances, electromagnetic waves may affect amount of electrical energy stored in one or more display pixels of an electronic display and, thus, actual luminance. For example, when a display pixel is being written (e.g., refreshed), electromagnetic waves may induce voltage and/or current in a conductor coupled to the display pixel, thereby affecting a data signal supplied to the display pixel and, thus, stored electrical energy. The effect on stored electrical energy and, thus, actual luminance may vary based at least in part on strength of the electromagnetic waves interacting with the conductor. Since strength generally decreases inversely proportional with distance squared, to enable sufficiently powering a passive NFC tag, an active NFC reader may output strong electromagnetic waves, for example, relative to other electromagnetic waves that typically interact with the conductor. As such, when implemented with both an active NFC reader (e.g., NFC module operating in an active NFC reader mode) and an electronic display, the strength of electromagnetic waves that interact with conductors in the electronic display may be high, thereby increasing likelihood of a perceivable visual artifact (e.g., mura) occurring, for example, due to actual luminance of one or more display pixels perceivably differing from its target luminance indicated by corresponding image data. While this discussion has generally referred to NFC as an example, radio frequency signals from other radio frequency transceivers in the electronic device may also produce display artifacts on the electronic display if the radio frequency signals are strong enough.

As such, the present disclosure provides techniques to facilitate improving perceived image quality provided by an electronic device implemented with a radio frequency transceiver (e.g., as found in an NFC module) and an electronic display. For example, controlling (e.g., adjusting) emission periods of the radio frequency transceiver (e.g., NFC module) and/or refresh periods of the electronic display, few or no radio frequency signals may be emitted while the electronic display is actively writing data to its pixels (e.g., during a display refresh period). This may reduce or prevent the pixels of the electronic display from being changed by strong radio frequency signals. To facilitate improving perceived image quality, in some embodiments, a controller (e.g., NFC controller and/or timing controller) may control parameters (e.g., timing and/or duration) of the NFC module emission periods and/or parameters of the electronic display refresh periods to reduce amount of overlap between the emission periods and the refresh periods. For example, the controller may adjust timing and/or duration of the NFC module emission periods such that emission periods occur during blanking periods (e.g., vertical blanking periods and/or horizontal blanking periods) between electronic display refresh periods. Additionally or alternatively, the controller may adjust timing and/or duration of the electronic display refresh periods such that blanking periods between refresh periods occur during NFC module emission periods, for example, by adjusting refresh rate of the electronic display.

Moreover, in some embodiments, parameters of the NFC module emission periods and/or parameters of the electronic display refresh periods may be adjusted based at least in part on an operational mode of the NFC module. For example, when operating in an object-detection mode (e.g., sub-mode of active NFC reader mode), the NFC module may emit short bursts (e.g., 100 µs) of electromagnetic waves to facilitate detecting presence of objects within a threshold distance from the electronic device. In some embodiments, duration of the emission periods while in the object-detection mode may be shorter than other operational modes, for example, such that the emission periods have shorter duration than blanking periods resulting from the electronic display implementing a first (e.g., 60 Hz or maximum) refresh rate. As such, in some embodiments, the controller may control timing of the NFC module emission periods such that each occurs during a blanking period, for example, while maintaining the electronic display at the first refresh rate.

In some embodiments, an electronic display may refresh based on a synchronization (e.g., control) signal, such as a tearing effect (TE) signal or a vertical synchronization (V-synch) signal. For example, the electronic display may refresh (e.g., write) its display pixels when the tearing effect signal is high. As such, in some embodiments, the controller may control timing and/or duration of the NFC module emission periods based at least in part on the timing signal. For example, the controller may control timing and/or duration of the NFC module emission periods such that each occurs when the tearing effect signal is low. In some instances, the synchronization signal may be generated by the electronic display and directly sent to the radio frequency transmitter (e.g., NFC module). In other instances, the synchronization signal may be generated by the NFC module and directly sent to the electronic display. The synchronization signal may also be transmitted by the controller to the electronic display and/or NFC module.

In any case, when operating in a polling mode (e.g., sub-mode of active NFC reader mode), the NFC module may emit medium bursts (e.g., 40 ms) of electromagnetic waves to facilitate determining whether a detected object is an NFC device. In some embodiments, duration of the emissions periods while in the polling mode may be longer than the object-detection mode, for example, such that the emission periods have longer duration than blanking periods resulting from the electronic display implementing the first (e.g., 60 Hz or maximum) refresh rate. As such, in some embodiments, the controller may control the refresh rate of the electronic display such that each NFC module emission period occurs during a blanking period, for example, by lowering the refresh rate from the first refresh rate to a second (e.g., 10 Hz or intermediate) refresh rate that results in blanking periods with durations greater than the emission periods.

Furthermore, when operating in a reading mode (e.g., sub-mode of active NFC reader mode), the NFC module may emit long bursts (e.g., 100 ms or greater) of electromagnetic waves to facilitate supplying the NFC device with sufficient electrical energy to wirelessly transmit data back to the NFC module. In some embodiments, duration of the emissions periods while in the reading mode may be longer than the polling mode, for example, such that the emission periods have longer duration than blanking periods resulting from the electronic display implementing the second refresh rate. When refresh rate can further be reduced, in some embodiments, the controller may control the refresh rate of the electronic display such that each NFC module emission period occurs during a blanking period, for example, by lowering the refresh rate from the second refresh rate to a third (e.g., 1 Hz or minimum) refresh rate that results in blanking periods with duration greater than the emission periods.

Additionally or alternatively, image content may be adjusted to facilitate reducing likelihood of perceivable visual artifacts resulting on the electronic display. For example, when duration of NFC module emission periods in the reading mode is greater than duration of blanking periods resulting from the electronic display implementing its minimum (e.g., 1 Hz) refresh rate, the electronic display may be provided with image data corresponding with a black screen while the NFC module is operating in the reading mode. In other words, in some embodiments, the NFC module may indicate when it desires to change operational modes to enable an image data source to adjust image content and, thus, corresponding image data accordingly.

With the foregoing in mind, an electronic device 10, which may utilize an electronic display 12 to display images and an NFC module 25, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, memory 20 that may be local to the device 10, a main memory storage device 22, a network interface 24, an NFC module 25, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the main memory storage device 22 may be included in a single component. Additionally, the image processing circuitry 27 (e.g., a graphics processing unit (GPU)) may be included in the processor core complex 18.

As depicted, the processor core complex 18 is operably coupled with memory 20 and the main memory storage device 22. In some embodiments, the memory 20 and/or the main memory storage device 22 may be tangible, non-transitory, computer-readable media that stores instructions executable by the processor core complex 18 and/or data to be processed by the processor core complex 18. For example, the memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instructions stored in memory 20 and/or the main memory storage device 22 to perform operations, such as signaling the NFC module 25 to emit electromagnetic waves. As such, the processor core complex 18 may include one or more general purpose microprocessors, one or more application specific processors (ASICs), one or more field programmable logic arrays (FPGAs), or any combination thereof.

Further, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image content to the portable storage device and/or receive image content from the portable storage device.

Furthermore, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. As depicted, the processor core complex 18 is operably coupled with input devices 14, which may enable a user to interact with the electronic device 10. In some embodiments, the inputs devices 14 may include buttons, keyboards, mice, trackpads, and the like.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image content to a network and/or receive image content from the network for display on the electronic display 12.

The network interface 24 may be coupled with the NFC module (e.g., device) 25 that may enable the electronic device 10 to wirelessly communicate with another electric device, such as a standalone NFC device and/or another NFC module implemented in the other electronic device. Further, the NFC module 25 may transmit and receive data (e.g., information) to/from the network interface 24 that may be communicated to another electronic device capable of near-field communication. Generally, the NFC module 25 may use electromagnetic (e.g., radio frequency) waves to wirelessly communicate the data. Additionally, the NFC module 25 may be implemented in a device acting as an active NFC reader (e.g., NFC module operating in an active NFC reader mode) that reads data from a device acting as a passive NFC tag (e.g., NFC module operating in a passive NFC tag mode). Alternatively, the NFC module 25 may be implemented in a device acting as a passive NFC tag that transmits information to a device acting as an active NFC reader. To facilitate operation mode of the NFC module 25, the NFC module 25 may be operably coupled to the processor core complex 18. The processor core complex 18 may act as an NFC controller that may control parameters (e.g., timing and/or duration) of the NFC module 25 emission period to reduce overlap between emission period and display 12 refresh period, thereby reducing the perceptibility of display artifacts (e.g., muras).

The electronic display 12 may use, for example, organic light-emitting diode (OLED) or liquid-crystal display (LCD) technology to present visual representations of information by display images such, as a graphical user interface (GUI) of an operating system, an application interface, a still image, or video content. As described above, the electronic display 12 may display the images based on image content received from memory 20, a storage device (e.g., main memory storage device 22 and/or an external storage device), and/or another electronic device 10, for example, via the network interface 24 and/or the I/O ports 16. The electronic display 12 may display the images once the image content has been fetched from memory 20 and processed by the image processing circuitry 27. The electronic display 12 may also include touch components that enable user inputs to the electronic device 10 by detecting occurrence and/or position of an object touching its screen (e.g., surface of the electronic display 12).

Figure 2:
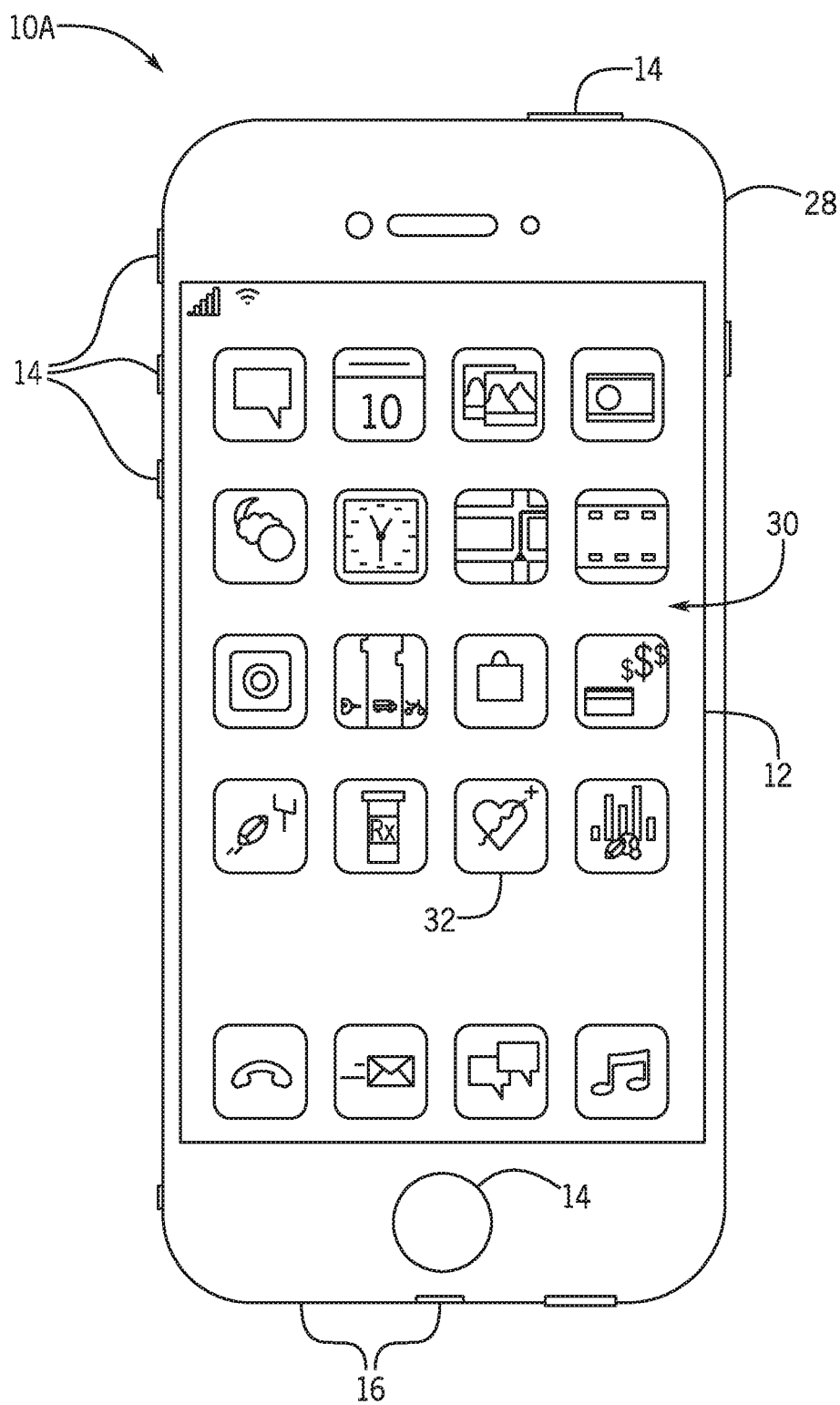
FIG. 2 is an example of the electronic device of FIG. 1 in the form of a handheld device, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
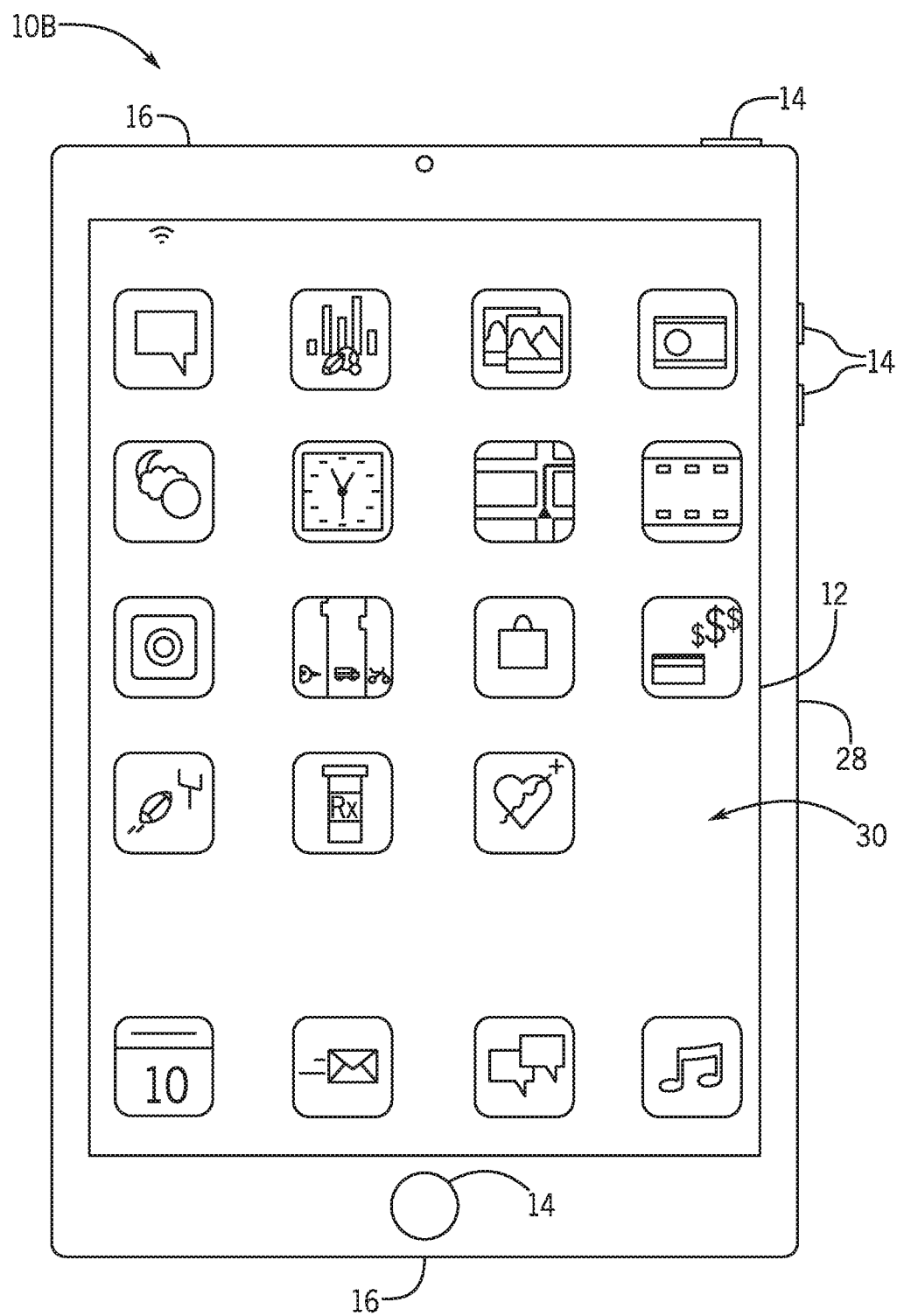
FIG. 3 is another example of the electronic device of FIG. 1 in the form of a tablet device, in accordance with an embodiment.
Figure 4:
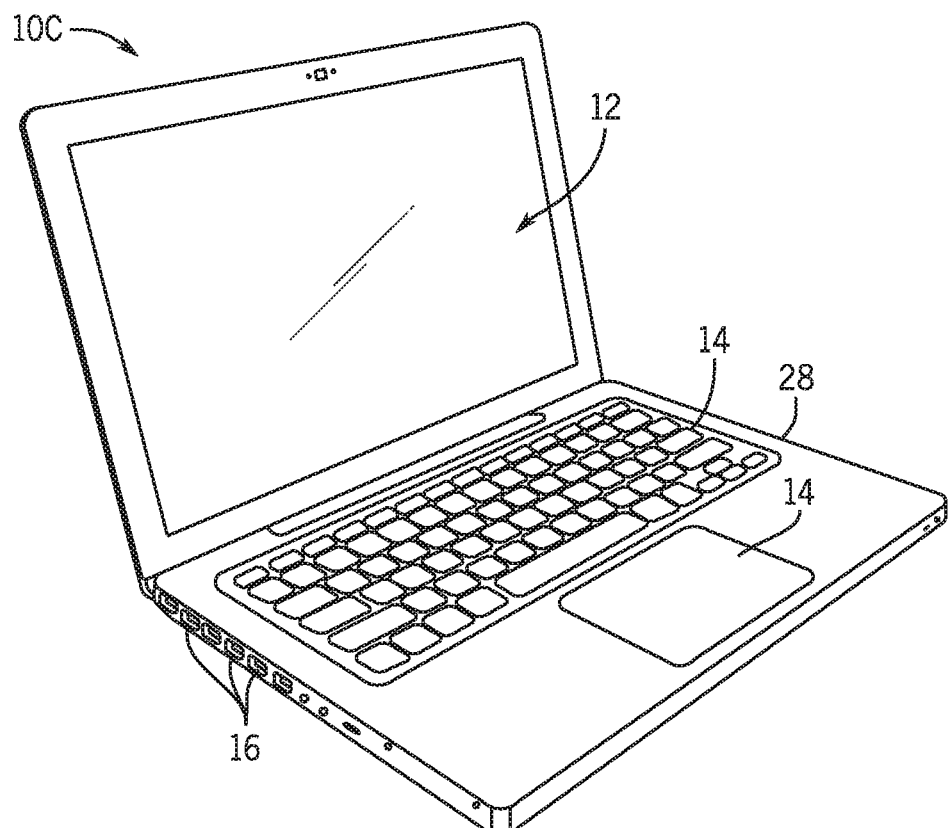
FIG. 4 is another example of the electronic device of FIG. 1 in the form of a notebook computer, in accordance with an embodiment.
Figure 5:
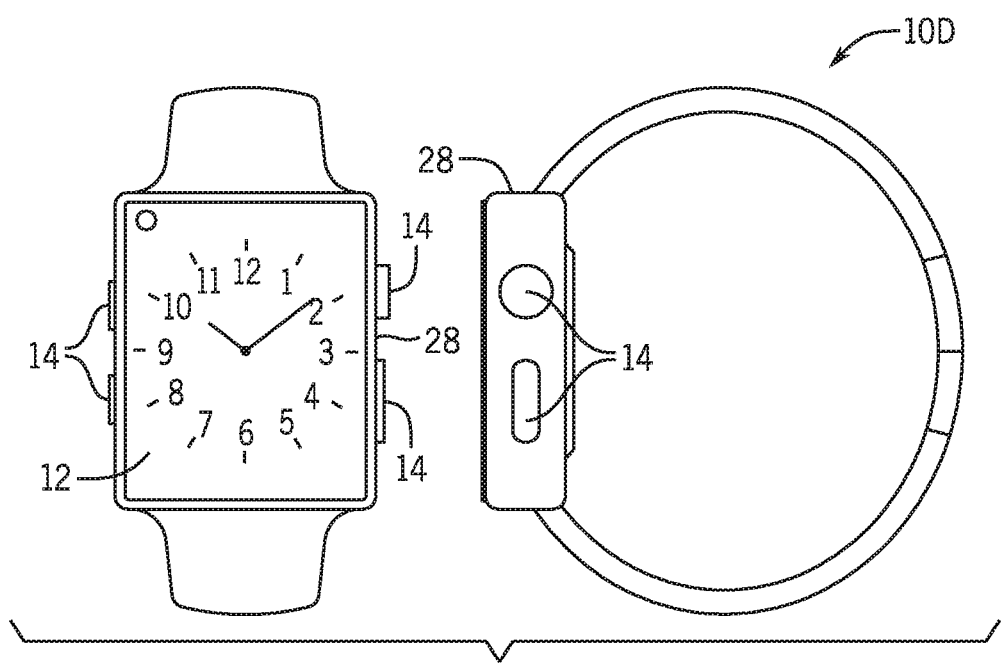
FIG. 5 is another example of the electronic device of FIG. 1 in the form of a smart watch, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic device 10 may include an electronic display 12 that may display images based at least in part on the image content, for example, retrieved from the local memory 20 and/or the main memory storage device 22. Additionally, as described above, an electronic device 10 may include an NFC module 25 to facilitate wireless data communication with another electronic device 10, such as a standalone NFC device and/or another NFC module 25 implemented in the other electronic device 10. In some embodiments, operational timing of the electronic display 12 and the NFC module 25 may be coordinated (e.g., controlled), for example, to reduce (e.g., minimize) overlap between emission periods of the NFC module 25 and refresh periods of the electronic display 12.

Figure 6:
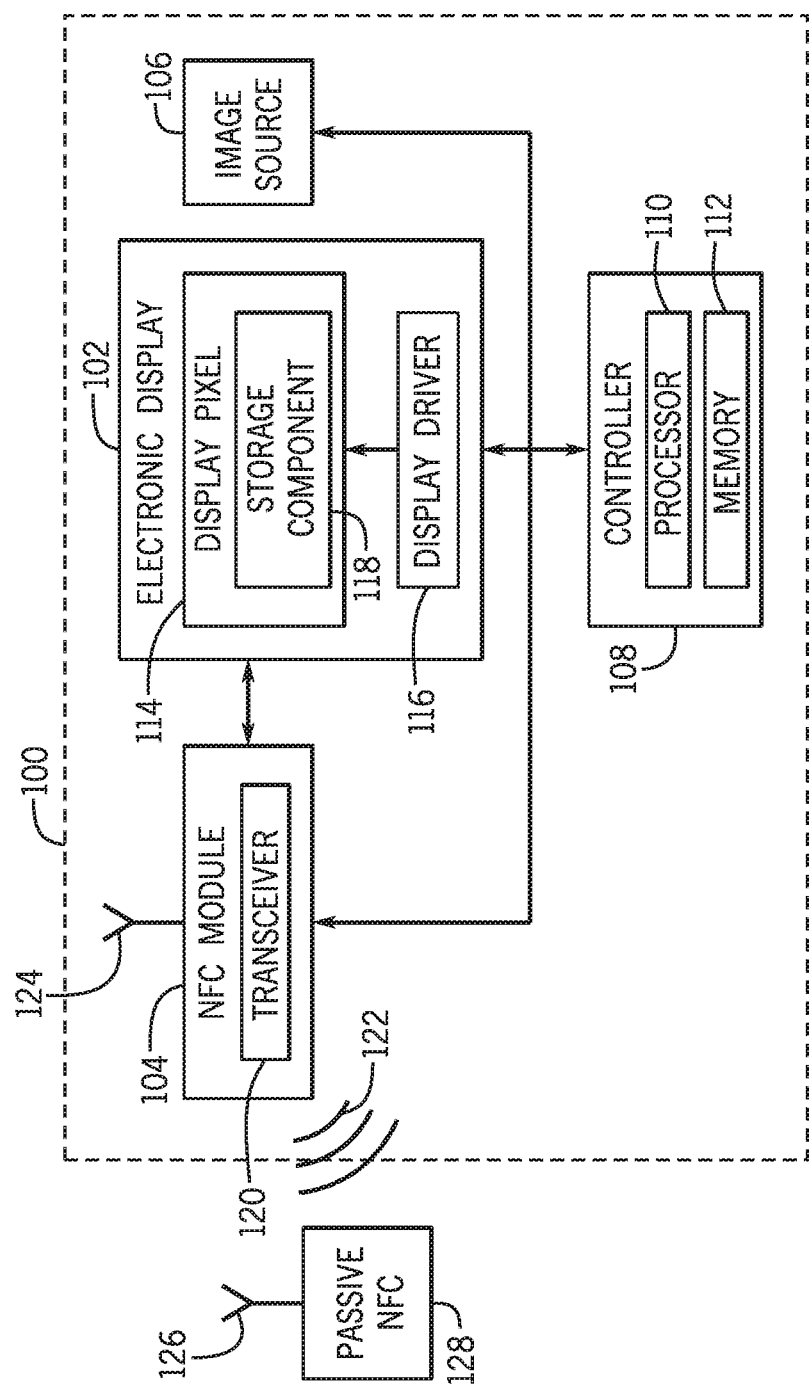
FIG. 6 is a block diagram of a portion of the electronic device of FIG. 1 including an electronic display and a near-field communication (NFC) module, in accordance with an embodiment.

To help illustrate, a portion 100 of the electronic device 10, which includes an electronic display 12 and an NFC module 25, is shown in FIG. 6. In some embodiments, a controller 108 may control operations of the NFC module 25, the electronic display 12, and/or an image source 106. For example, the controller 108 may synchronize emission of NFC (e.g., electromagnetic and/or radio frequency) waves from the NFC module 25 with the blanking period of the electronic display 12. Although depicted as a single controller 108, in some embodiments, an individual controller may be implemented for each of the NFC module 25, the electronic display 12, and/or the image source to control operation. As another example, synchronization signal may be generated by the electronic display 12 and directly sent to the NFC module 25 and vice versa. Further, controllers may be added to smooth the timing sequence during the transition of the NFC modes, as will be discussed in more detail below. Furthermore, additional controllers may be added for better user front-of-screen and NFC communication experience.

To facilitate controlling operations, the controller 108 may include a controller processor 110 and controller memory 112. In some embodiments, the controller processor 110 may execute instructions stored in the controller memory 112. Thus, in some embodiments, the controller processor 110 may be included in the processor core complex 18, the image processing circuitry 27, a timing controller in the electronic display 12, a separate processing module, or any combination thereof. Additionally or alternatively, the controller memory 112 may be included in local memory 20, the main memory storage device 22, internal memory of the NFC module 25, a separate tangible, non-transitory, computer readable medium, or any combination thereof.

In some embodiments, the controller 108 may be operably coupled to an image source 106. The image source 106 may be a memory buffer, a portion of the memory storage device 22, and/or the like. The image source 106 may hold image data (e.g., content) to be presented via the electronic display 12. In some embodiments, the controller 108 may additionally or alternatively be coupled to the electronic display 12. The controller 108 may be a timing controller (TCON) that may active and deactivate the display pixels 114 when displaying different image frames. Further, the controller 108 may synchronize when new image content is sent from the image source 106 to the electronic display 12 and display pixels 114. The controller 108 may also control the refresh rate of the electronic display 12 and thereby the refresh period and blanking period durations.

The controller 108 may interface with the display driver 116 to populate (e.g., write or refresh) the display pixels 114 with the image content at the appropriate time. The display pixels 114 may be LCD or OLED technology which may have similar operational principles. For example, the electronic display 12 may generally display image frames by controlling luminance of the display pixels 114 based in part on image content stored within the display pixels 114. Although a single display pixel 114 is shown, it should be appreciated that a display may include several hundreds to several million display pixels 114, each with its own storage component 118.

The storage component 118 may be, for example, a storage capacitor that stores an amount of charge corresponding to the image data of that display pixel 114. Depending on the display technology, the capacitor voltage may be used to generate a luminance proportional to the image content (e.g., bit value of image content). For example, OLEDs may use the capacitor voltage to operate a driving trans-film transistor (TFT) in the active region, thereby controlling the magnitude of the supply current to the organic layer of the OLED pixel. The image content may be sent to and stored in the storage component 118 during the refresh period of the electronic display 12.

In some embodiments, the controller 108 may be additionally or alternatively coupled with the NFC module 25. In such instances, the controller 108 may act as an NFC controller used to time the emission of NFC electromagnetic waves, adjust the duration of the NFC emission period, determine the operational mode (e.g., polling mode, reading mode, and/or object-detection mode) of the NFC module 25, and/or the like. The NFC module 25 may include a transceiver 120 capable of both transmitting and receiving NFC electromagnetic waves 122 depending on whether the electronic device 10 is acting as a passive or active NFC device. It should be appreciated that although an NFC module 25 is shown and described, any radio frequency transmitter may be implemented by the electronic device 10 to facilitate communication with other devices.

The NFC module 25 may include an antenna 124 to facilitate emission of NFC waves 122 from the NFC module 25. However, because NFC technology relies on magnetic induction to drive the transfer of information from one device to another, in some embodiments, the antenna 124 may vary from a traditional radio frequency antenna, for example, such that the antenna 124 may be better thought of as a large inductor.

Inductors are coils that may generate a low frequency radio-wave field (i.e., magnetic field) when current flows through the coils. Inductors may be coupled together (e.g., mutual coupling) when the magnetic field of one inductor permeates the coils of a second inductor (e.g., antenna 126) because the magnetic field induces a current within the second inductor (e.g., NFC electromagnetic waves 122 transmitted to the passive NFC device 128). This may be known as charging or activating the passive NFC device and allows for contactless energy transfer between devices that NFC technology is built upon.

For example, the controller 108 may signal (e.g., instruct) the NFC module 25 to act as an active NFC device (e.g., NFC reader) and emit NFC electromagnetic waves 122 to a passive NFC device 128 (e.g., NFC tag) upon detecting the presence of a passive NFC device 128. The transceiver 120 may use the inductor antenna 124 to transmit the NFC electromagnetic waves 122 by running current through the inductor antenna 124 at radio frequencies (e.g., 13.56 MHz). The coils of the inductor antenna 124 generate a magnetic field that is emitted for short distances (e.g., 4 cm).

When the passive NFC device 128 is brought within a threshold (e.g., short) distance of the inductor antenna 124 of the active NFC device, mutual coupling between the inductor antennas 124 and 126 may occur, thereby charging the NFC tag. That is, the NFC electromagnetic waves generated when the inductor antenna 124 generates the magnetic field induce an electric current in the inductor antenna 126 of the passive NFC device 128. The induced electric current may induce a magnetic field that interacts with the NFC electromagnetic waves 122 generated by the inductor antenna 124. The transceiver 120 may detect the induced magnetic field, for example, based on an analog electrical signal generated by the inductor antenna 124 to read the information (e.g., data) provided by the passive NFC device 128.

In this instance, the electronic device 10 including the NFC module 25 is referred to as the active NFC device since the electronic device 10 is using power to generate NFC electromagnetic waves 122 via the magnetic field (e.g., running current through the inductor antenna 124). The passive NFC device 128 is considered passive as either it does not have its own power supply and/or has turned off its power supply, relying on mutual coupling for the energy source. Thus, the active NFC device may send the NFC electromagnetic waves 122 and the passive NFC device 128 may accept the NFC electromagnetic waves 122. It should be understood that while the NFC module 25 has been shown as part of an active NFC device, the device may also act passively, allowing for another active NFC device to generate the magnetic field to read information from the portion 100 of the device 10.

Since NFC technology relies on NFC electromagnetic waves 122 generated during magnetic induction to transfer information, the magnetic field that appears when NFC electromagnetic waves 122 are emitted may affect the storage of image content in the display pixels 114 when the magnetic field interacts with the electronic display 12. For example, the storage component 118 may be a storage capacitor that stores charge during the refresh period corresponding to the luminance of the image content. Because the NFC module 25 may be in close proximity to the display pixels 114 in more compact electronic device 10 designs, the magnetic field generated by the NFC module 25 during emission of NFC electromagnetic waves 122 may permeate through the display pixels 114. The magnetic field may increase or decrease the amount of charge stored in the storage capacitor in the storage component 118.

The charge stored affects the voltage available for driving the display pixel 114. For example, if the magnetic field causes less charge to be stored in the storage component 118 than the correct amount of charge corresponding to the image content, less voltage is available to drive the transfilm transistor (TFT) resulting in less luminance from that pixel. The magnetic field may cause such patterned voltage imbalances that may appear as visible artifacts, such as muras. However, by synchronizing the blanking period of the electronic display 12 and the emission period of the NFC electromagnetic waves 122, likelihood that the magnetic field generated by the NFC technology affect electrical energy stored in display pixels of the electronic display 12 may be reduced, thereby mitigating the appearance of display artifacts caused by the emission of NFC electromagnetic waves 122.

Figure 7:
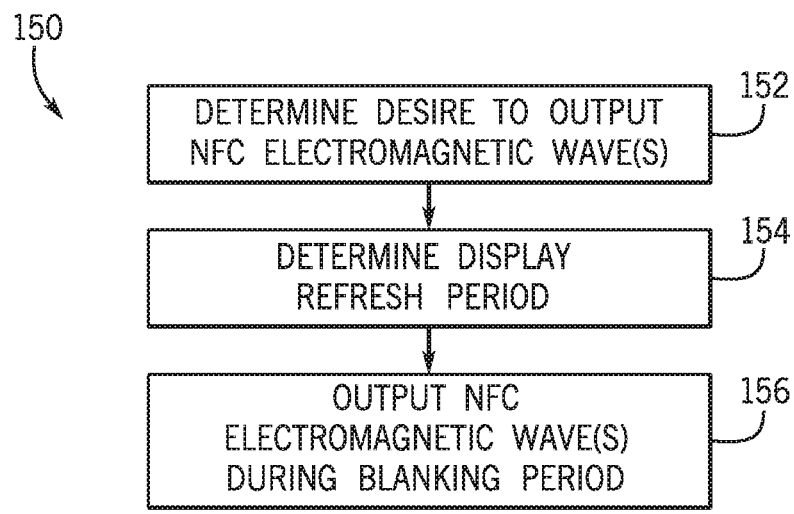
FIG. 7 is a flow diagram of a process for operating the electronic display and the NFC module of FIG. 6, in accordance with an embodiment.

To help further illustrate, FIG. 7 describes a process 150 for timing the emission of NFC electromagnetic waves 122 and the display blanking period such that the emission period overlaps with the blanking period instead of the refresh period. Generally process 150 includes determining a desire to output NFC electromagnetic wave (process block 152), determining the electronic display 12 refresh period (process block 154), and outputting the NFC electromagnetic wave 122 during the blanking period of the electronic display 12 (process block 156). While process 150 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 150 may be implemented at least in part by a processor core complex 18 and/or the controller 108 that executes instructions stored in a tangible, non-transitory, computer-readable medium, such as the memory 20. In alternative or additional embodiments, at least some steps of the process 150 may be implemented by any other suitable components or control logic, such as another electronic device, and/or the like. Furthermore, it should be appreciated that the process 150 may apply to any radio frequency waves that are transmitted from, for example, a radio frequency transceiver and may cause the appearance of display artifacts.

Thus, in some embodiments, the controller 108 may determine the desire to output a NFC electromagnetic wave 122 (process block 152). For example, upon detection by the controller 108 and/or NFC module 25 that a passive NFC device 128 is within proximity, the controller 108 may signal the NFC module 25 to read the passive NFC device 128 by emitting NFC electromagnetic waves 122 of 30 µs durations. Further, the controller 108 may determine the electronic display 12 refresh period (process block 154). That is, the controller 108 may determine, based on a current or new refresh rate, when the refresh period is occurring (e.g., image content is being sent to the display pixels 114) and when the blanking period is occurring.

Based on the desire to output NFC electromagnetic waves 122 of a specific duration and on the duration of the display refresh period, the controller 108 may synchronize the output of the NFC electromagnetic waves 122 during the blanking period of the electronic display 12 to reduce the effect of the NFC electromagnetic waves 122 on the storage component 118 (process block 156). For example, the controller 108 may determine that the emission duration of the NFC electromagnetic waves 122 is greater than the blanking period of the electronic display 12 and may break up the emission of the NFC electromagnetic waves 122 to fit within the blanking period. Additionally or alternatively, the controller 108 may determine that the blanking period of the electronic display 12 may be extended to accommodate for a longer emission period duration for NFC electromagnetic waves 122 and, thus, may adjust the refresh rate of the electronic display 12.

Figure 8:
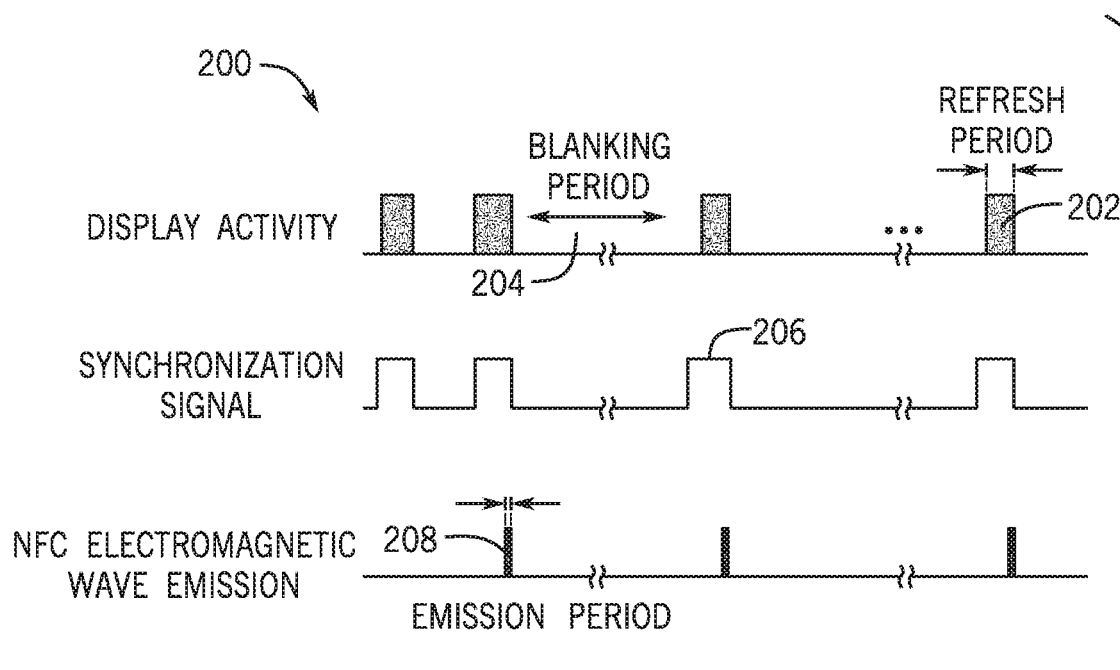
FIG. 8 is a timing diagram that describes an operation of the electronic display and the NFC module of FIG. 6 while the NFC module is operating in an object-detection mode, in accordance with an embodiment.

To further illustrate the synchronization of the emission period of NFC electromagnetic waves 122 with the electronic display 12 blanking period, FIG. 8 is a timing diagram describing NFC activity and display activity while the NFC module is operating in an object-detection mode. As depicted, the display may have a frame time (e.g., image display duration) dictated by the current refresh rate. The frame time may be divided into a refresh period 202 and a blanking period 204. During the refresh period 202, the electronic display 12 may write an image to its display pixels 114 by controlling storage of electrical energy in each of the display pixels, for example, by successively connecting the storage components 118 of the display pixels 114 to corresponding data lines. While ceasing to refresh, the electronic display 12 continuing to displaying the image during the blanking period 204, for example, by maintaining the storage components 118 of the display pixels 114 electrically disconnected from the data lines.

In some embodiments, a synchronization signal 206 (e.g., tearing effect (TE) signal and/or a vertical synchronization (V-synch) signal) may reflect the blanking period 204 and refresh period 202 of the electronic display 12. For example, the synchronization signal 206 may be high (e.g., "1" bit or a first state) during the refresh period 202 when image content may be stored within the display pixels 114. On the other hand, the synchronization signal 206 may be low (e.g., "0" bit or second state) during the blanking period 204 when no image content is being written to the display pixels 114. In other words, the synchronization signal 206 may be triggered at the beginning of the refresh period to indicate that a new image frame may be drawn.

To facilitate operational synchronization, in some embodiments, the synchronization signal 206 may also be provided to other portions of the electronic device 10. For example, in addition to the electronic display 12, the electronic device 10 may provide the synchronization signal 206 to the controller 108 and/or directly to the NFC module 25 from the electronic display 12. In this manner, operational timing of the NFC module 25 may also be controlled based on the synchronization signal 206, for example, such that NFC module 25 does not output NFC electromagnetic waves while the synchronization signal 206 is high and/or only outputs NFC electromagnetic waves while the synchronization signal 206 is low.

In some instances, the NFC module 25 may spend a substantial amount of time in an object-detection mode. In some embodiments, the object-detection mode may provide low power functionality that saves energy and/or extends battery life of the electronic device 10. Specifically, the object-detection mode may turn off the magnetic field (e.g., not emit NFC electromagnetic waves 122) when the NFC device is not near another NFC device. However, to detect a passive NFC device, the controller 108 may periodically signal the NFC module 25 to emit short impulse NFC electromagnetic waves 208. As depicted, the short impulse NFC electromagnetic waves 208 may occur, for example, between refresh periods 202, during the blanking period 204, and when the synchronization signal 206 is low.

By emitting short impulse NFC electromagnetic waves 208 during the blanking period 204, the magnetic field generated during emission of the short impulse NFC electromagnetic waves 208 may less likely affect the image content stored within the display pixels 114, thereby reducing and/or eliminating the appearance of display artifacts. Further, when the short impulse NFC electromagnetic waves 208 interact with a potential passive NFC device 128, an indication may be sent to the controller 108 to switch the NFC module 25 mode, adjust the emission duration of NFC electromagnetic waves 122, and/or adjust the blanking period 204 duration of the electronic display 12. In some instances, upon detecting a potential passive NFC device 128 the electronic display 12 may be immediately refreshed with image content held within the pixels and/or the refresh rate may be lowered to less than the polling mode rate.

Figure 9:
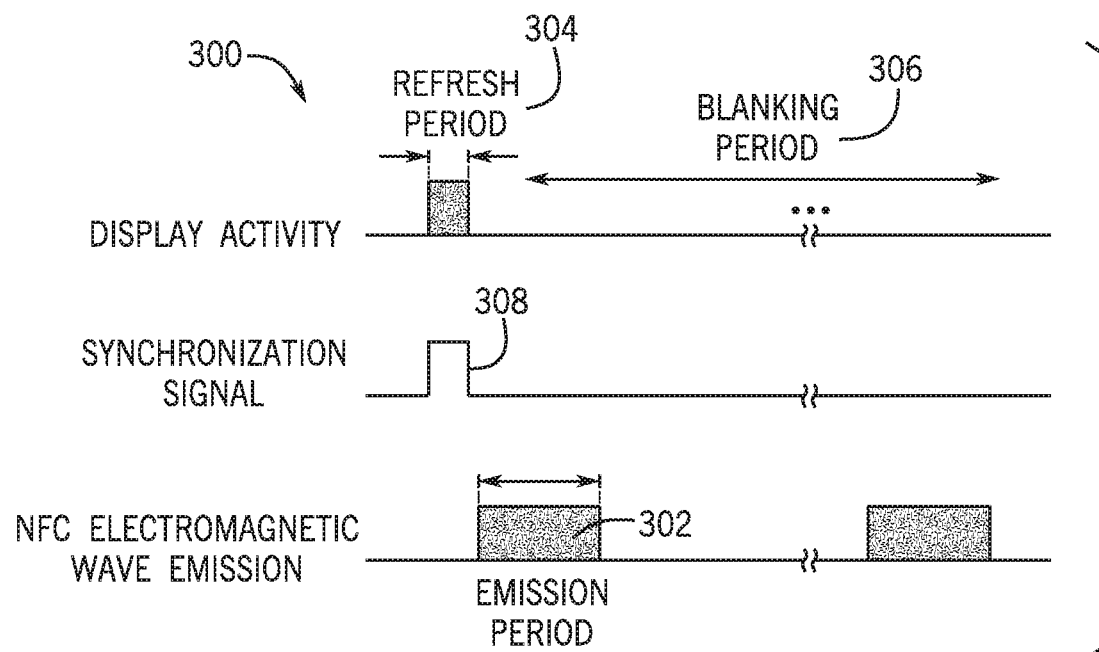
FIG. 9 is a timing diagram that describes an operation of the electronic display and the NFC module of FIG. 6 while the NFC module is operating in a polling mode, in accordance with an embodiment.

FIG. 9 is a timing diagram 300 describing the NFC and display activity while the NFC module 25 is operating in a polling mode. As depicted, during polling mode, the NFC module 25 may emit longer duration NFC electromagnetic waves 122 to determine whether the potential passive NFC device is actually a NFC device or whether it is, for example, just a piece of metal. For example, the longer emission period 302 durations may allow for more NFC electromagnetic waves 122 to charge the potential passive NFC device. That is, longer emission period 302 durations may allow the magnetic field generated by the NFC module 25 to adequately interact with the potential passive NFC device to induce a radio-wave field. When the induced radio-wave field does not behave as expected if the potential passive NFC device 128 were actually a passive NFC device 128, the controller 108 may signal to the NFC module 25 of the false positive and change the NFC module 25 mode back to the object-detection mode.

Because the emission period 302 duration may be longer when in the polling mode, the refresh rate of the electronic display 12 may be adjusted (e.g., to 1 Hz, less than the polling refresh rate). As depicted, the refresh rate of the display may decrease, resulting in less frequent refresh periods 304 and longer blanking periods 306. The longer blanking periods 306 may allow for enough time for the NFC electromagnetic waves 122 to be emitted without causing display artifacts since image content may not be stored in the display pixels 114 during the blanking period 306. The synchronization signal 308 may be used to by the controller 108 to synchronize the display activity with the NFC module 25 activity, for example, to avoid overlap between the emission period and the refresh period 304. In some embodiments, the synchronization signal 308 may be transmitted to the transceiver 120 from the controller 108 and/or directly from the electronic display 12 to facilitate synchronizing the operation of the NFC module 25 with the electronic display 12.

The refresh rate of the electronic display 12 may be adjusted by storing image content that does not require fast refresh rates in the display pixels 114. For example, still images may be stored in the display pixels 114 for display instead of fast moving images since fast moving images require fast refresh rates to avoid image blurring. The change in image content may occur towards the end of the object-detection mode once a potential passive NFC device has been detected or at the beginning of the polling mode.

Further, the emission period 302 duration may be also or alternatively reduced, for example, to avoid dramatic reduction of the refresh rate when a higher refresh rate may be desirable. In particular, the emission period 302 may be longer during polling mode to ensure that the potential passive NFC device is adequately charged via mutual coupling. By increasing the strength of the magnetic field carried by the NFC electromagnetic waves 122, the energy transferred to the potential passive NFC device occurs at a faster rate. Thus, a shorter emission period 302 that may fit within the blanking period 306 of a faster refresh rate may be used to adequately charge the potential passive NFC device. Additionally, both the refresh rate and emission period 302 duration may be adjusted by the controller 108 to reduce overlap in emission period 302 and refresh period 304 while reducing and/or mitigating the appearance of display artifacts.

Figure 10:
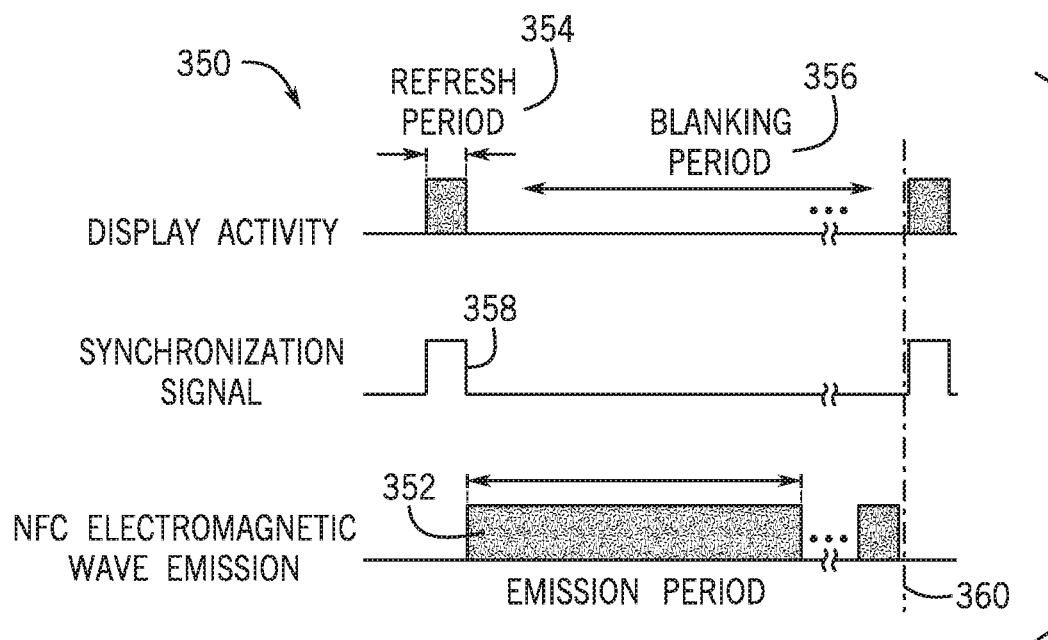
FIG. 10 is a timing diagram that describes an operation of the electronic display and the NFC module of FIG. 6 while the NFC module is operating in a read-detection mode, in accordance with an embodiment.

Upon determining that the potential passive NFC device is indeed an NFC device (e.g., tag engagement), the NFC module 104 may enter read mode. To help illustrate, a timing diagram 350 that describes the NFC and display activity while the NFC module 25 operates in a reading mode is shown in FIG. 10. In the reading mode, the NFC module 25 may transmit NFC electromagnetic waves 122 to the passive NFC device 128 and read information held by the passive NFC device 128.

During reading mode, the emission period 352 of the NFC electromagnetic waves 122 may be longer than the emission periods during the object-detection mode 208 and/or during the polling mode 302 since information is being transferred from the passive NFC device 128 to the active NFC device. To prevent the longer duration NFC electromagnetic waves 122 from causing display artifacts, the refresh rate of the display may be further adjusted (e.g., minimum refresh rate). As depicted, the refresh period 354 may occur less frequently and the blanking period 356 may be relatively long. Further, as depicted, NFC electromagnetic waves 122 may be emitted for most of the blanking period 356.

In particular, the longer emission period 352 and the refresh period 354 may by synchronized by a controller 108 such that the periods do not overlap. In some instances, the controller 108 may use the synchronization signal 358 to determine when the blanking period 356 is occurring and when to signal the NFC module 25 to emit NFC electromagnetic waves 122. Alternatively, in some embodiments, the controller 108 may pause monitoring of the synchronization ssignal 358 upon entering reading mode as the blanking period 356 may last the entire duration of the reading mode. Additionally, the controller 108 may adjust the refresh rate and the emission period 352 duration.

For example, the controller 108 may store black images in the display pixels 114. Perceived image quality of black images (e.g., absence of voltage on the storage capacitor) may be maintained with minimal refreshing. Thus, the blanking period 356 may be long enough that the emission period 352 safely overlaps only the blanking period 356 and not the refresh period 354, thereby mitigating the appearance of display artifacts, such as muras. Using black images or low voltage images during the read period is also advantageous because less charge is stored in the display pixels 114 for displaying such images. As such, the magnetic field generated during NFC electromagnetic wave 122 emissions may have less perceivable effect on the displayed image content. That is, the black image may hide any display artifacts induced by the magnetic field. The electronic display 12 may be refreshed with a black image upon determination of the passive NFC device 128 or at the initiation of the reading mode. After the information has been transferred from the passive NFC device 128 to the active NFC device (e.g., read finished 360), the NFC module 25 may return to polling mode or to object-detection mode.

Further, in some embodiments, the shape of the NFC antenna 124/126 inductor coil and/or the location of the inductor coil relative to the display 12 may affect where the display artifacts are induced on the electronic display 12. For example, the coil shape may cause most of the display artifacts, such as muras, to appear on the edges of the display 12. In such instances, an image with a mostly black background (e.g., an image with a black border of a large width) may be stored in the display pixels 114 instead of the purely black image since such an image may be sufficient to hide any display artifacts induced by the magnetic field.

Figure 11:
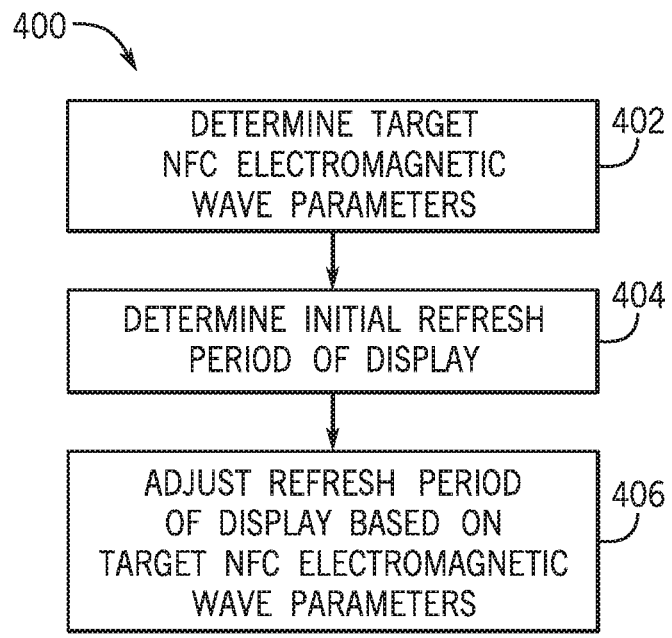
FIG. 11 is a flow diagram of a process for determining a display refresh period to be implemented by the electronic display of FIG. 6, in accordance with an embodiment.

A process 400 for adjusting the display refresh period based on NFC electromagnetic wave properties to reduce overlap of the NFC emission period and the display refresh period is described in FIG. 11. Generally, the process 400 includes determining the parameters of the target NFC electromagnetic wave 122 (process block 402), determining the initial refresh period of the electronic display 12 (process block 404), and adjusting the refresh period of the electronic display 12 based on the target NFC electromagnetic wave parameters (process block 406). While process 400 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 400 may be implemented at least in part by a processor core complex 18 and/or the controller 108 that executes instructions stored in a tangible, non-transitory, computer-readable medium, such as the memory 20. In alternative or additional embodiments, at least some steps of the process 400 may be implemented by any other suitable components or control logic, such as another electronic device, and the like. Furthermore, it should be appreciated that the process 400 may apply to any radio frequency waves that are transmitted from, for example, a radio frequency transceiver and may cause the appearance of display artifacts.

Thus, in some embodiments, the controller 108 may determine target parameters of the NFC electromagnetic waves 122 (process block 402). In some embodiments, the parameters may include the amount of energy that must be transferred, the pulse duration of the target NFC electromagnetic waves 122, and the frequency of the pulse durations. For example, more energy must be transferred to the passive NFC device 128 by the target NFC electromagnetic waves 122 during polling mode (e.g., charging the tag) than during object-detection mode (e.g., discovering a potential tag). As another example, the pulse duration may be shorter when discovering a potential tag than when reading information from a tag.

Additionally, the controller 108 may determine the initial refresh period of the electronic display 12 (process block 404). The refresh rate of the display may determine the frequency of the refresh period. Further, display technology, for example, may determine the duration of the refresh period since some display technology requires less time to store (e.g., refresh) image content into display pixels 114.

Furthermore, the controller 108 may adjust the refresh period of the electronic display 12 based on the target NFC electromagnetic wave parameters, for example, when the target NFC electromagnetic wave parameters cannot be adjusted without compromising communication quality (process block 406). Additionally or alternatively, the refresh rate may be adjusted, for example, when system components (e.g., battery) requires fixed NFC electromagnetic wave parameters (e.g., fixed pulse strength to preserve battery life). Moreover, in some embodiments, image content to be displayed may be adjusted based at least in part on refresh rate. For example, the controller 108 may instruct the image source 106 to change image content from a fast image (e.g., an image that travels a large number of pixels between image frames) to a slow or still image. As another example, the controller 108 may instruct the image source 106 to change image content to a black image so that little to no refreshing is required.

Figure 12:
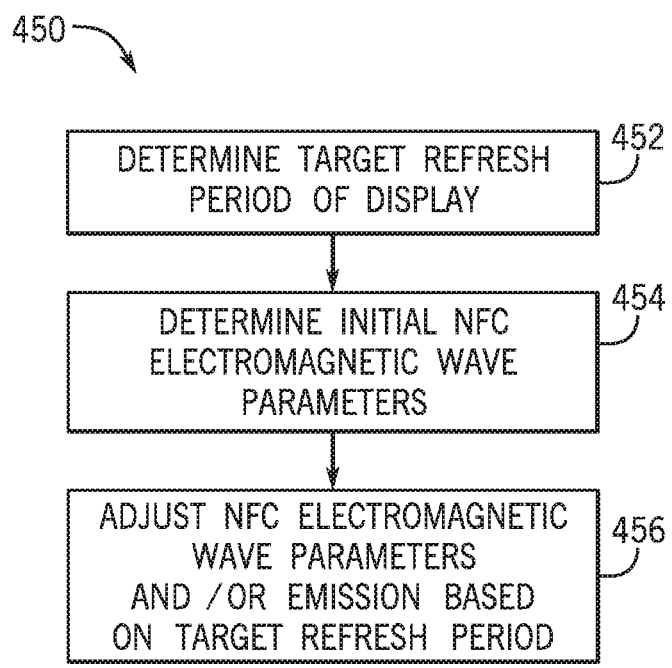
FIG. 12 is a flow diagram of a process for determining NFC electromagnetic wave parameters to be implemented by the NFC module of FIG. 6, in accordance with an embodiment.

To help further illustrate, a process 450 for adjusting the NFC electromagnetic wave properties based on the display refresh rate to reduce overlap of the NFC emission period and the display refresh period is described in FIG. 12. Generally, the process 450 includes determining the target refresh period of the electronic display 12 (process block 452), determining the initial NFC electromagnetic wave parameters (process block 454), and adjusting the NFC electromagnetic wave parameters based on the target refresh period (process block 456). While process 450 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 450 may be implemented at least in part by a processor core complex 18 and/or the controller 108 that executes instructions stored in a tangible, non-transitory, computer-readable medium, such as the memory 20. In alternative or additional embodiments, at least some steps of the process 450 may be implemented by any other suitable components or control logic, such as another electronic device, and the like. Furthermore, it should be appreciated that the process 450 may apply to any radio frequency waves that are transmitted from, for example, a radio frequency transceiver and may cause the appearance of display artifacts.

Thus, in some embodiments, the controller 108 may determine the target refresh period of the electronic display 12 (process block 452). The refresh rate of the display may determine the frequency of the refresh period. Further, display technology, for example, may determine the duration of the refresh period since some display technology requires less time to store (e.g., refresh) image content into display pixels 114.

Additionally, the controller 108 may determine the initial NFC electromagnetic wave parameters (process block 454). In some embodiments, the parameters may include the amount of energy that must be transferred, the pulse duration of the initial NFC electromagnetic waves 122, and the frequency of the pulse durations. For example, more energy must be transferred to the passive NFC device 128 by the NFC electromagnetic waves 122 during polling mode than during object-detection mode.

Based on the target refresh period of the electronic display 12, the controller 108 may instruct the NFC module 25 to adjust its NFC electromagnetic wave parameters, for example, when the refresh period may not be adjusted without compromising perceived image quality (process block 456). For example, the refresh period may not be changed when the display pixels require a minimum amount of time to store image contents. Further, the refresh period may not be adjusted when the image content is a fast moving image and cannot be substituted by a slow moving or still image. In such instances, the NFC electromagnetic wave parameters may be adjusted by changing the strength of the NFC electromagnetic waves 122. For example, if the passive NFC device 128 requires X amount of energy to produce an induced radio-wave field, the active NFC device may increase the strength of the NFC electromagnetic waves 122 to transfer X amount of energy in a shorter amount of time, thereby reducing the NFC emission period and, thus, potential overlap with display refresh periods.

Additionally or alternatively, the controller 108 may adjust the allowed time for the emission of the NFC electromagnetic waves based on the target refresh period of the electronic display 12 in an asynchronized format (process block 456). For example, a synchronization signal generated by the display 12 may indicate to the NFC module 104 to stop emission of NFC electromagnetic waves during refresh periods of the display 12. In some embodiments, the NFC module 104 may have an interrupt mechanism that is triggered when the synchronization signal indicates that the display 12 is or has entered the refresh period. In such cases, the parameters of the NFC electromagnetic waves (e.g., strength, duration) may be modified or may remain unmodified.

It should also be noted that in some embodiments, both the refresh period of the display and the NFC electromagnetic wave parameters may be adjusted to reduce overlap. For example, a black image may be written to the display pixels 114 and the refresh rate may be significantly reduced. As the same time, the NFC pulse duration may be shortened by increasing the strength of the NFC electromagnetic waves 122, for example, when extending the battery life is not a concern. Such a combination reduces the appearances of display artifacts that are more likely to occur when the strength of the NFC electromagnetic waves 122 is relatively high.

Display artifacts, such as muras, arising from interactions between NFC electromagnetic waves 122 and an electronic display 12 may be reduced and/or eliminated by controlling the emission of NFC electromagnetic waves 122 relative to the refresh period of the electronic display 12. An NFC module 25 within an electronic device 10 may be used by the electronic device 10 for contactless communication at short distances with another NFC device and/or NFC tag. In some instances, the overlap of the emission period of the NFC electromagnetic waves 122 with the refresh period of the electronic display 12 may result in display artifacts. Thus, to reduce the appearance of artifacts on the electronic display 12 of electronic devices 10 using NFC technology, timing of the emission period of NFC electromagnetic waves 122 and/or the refresh rate may be adjusted to stagger the emission period and refresh period.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
a radio frequency transceiver configured to output first electromagnetic waves during a first emission period;
a display panel comprising a plurality of display pixels, wherein the display panel is configured to display at least a first portion of a first image by writing to at least some of the plurality of display pixels during a first refresh period; and
a controller communicatively coupled to the radio frequency transceiver and the display panel, wherein the controller is programmed to:
determine a first target duration of the first emission period;
determine a first duration of a blanking period that occurs between the first refresh period and a second refresh period when the display panel implements a first refresh rate; and
instruct the radio frequency transceiver to adjust timing of the first emission period, instruct the display panel to adjust refresh rate from the first refresh rate, or both based at least in part on the first target duration of the first emission period and the first duration of the blanking period to facilitate reducing amount of overlap between the first emission period and the first refresh period.

2. The electronic device of claim 1, wherein the radio frequency transceiver is a near-field communication module operating in an active reader mode.

3. The electronic device of claim 1, wherein the controller is programmed to:
determine whether the first target duration of the first emission period is greater than the first duration of the blanking period; and
when the first target duration of the first emission period is not greater than the first duration of the blanking period:
instruct the display panel to display the first image using the first refresh rate;
determine a first target timing of the first emission period that occurs during the blanking period; and
instruct the radio frequency transceiver to output the first electromagnetic waves during the first emission period based at least in part on the first target duration and the first target timing of the first emission period.

4. The electronic device of claim 1, wherein the controller is programmed to:
determine a second duration of the blanking period that occurs between the first refresh period and the second refresh period when the display panel implements a second refresh rate lower than the first refresh rate; and
when the first target duration of the first emission period is greater than the first duration of the blanking period:
determine whether the first target duration of the first emission period is greater than the second duration of the blanking period; and
instruct the display panel to display the first image using the second refresh rate when the first target duration of the first emission period is not greater than the second duration of the blanking period.

5. The electronic device of claim 4, comprising an image source communicatively coupled to the controller, wherein:
the image source is configured to generate image data that indicates target luminance of the plurality of display pixels; and
the controller is programmed to instruct the image source to generate image data corresponding with a black image when the first target duration of the first emission period is greater than the second duration of the blanking period.

6. The electronic device of claim 4, wherein the controller is programmed to:
determine a third duration of the blanking period that occurs between the first refresh period and the second refresh period when the display panel implements a third refresh rate lower than the second refresh rate; and
when the first target duration of the first emission period is greater than the third duration of the blanking period:
determine whether the first target duration of the first emission period is greater than the third duration of the blanking period; and
instruct the display panel to display the first image using the third refresh rate when the first target duration of the first emission period is not greater than the third duration of the blanking period.

7. The electronic device of claim 1, wherein the electronic device comprises: a display system comprising: the radio frequency transceiver configured to output the first electromagnetic waves during the first emission period; the display panel comprising the plurality of display pixels, wherein the display panel is configured to: generate a first synchronization signal based at least in part on activity of the display panel; and supply the first synchronization signal to the radio frequency transceiver, the display system, or both; and the controller communicatively coupled to the radio frequency transceiver and the display panel, wherein the controller is programmed to: generate a second synchronization signal based at least in part on activity of the display panel and activity of the radio frequency transceiver; and supply the second synchronization signal to the display panel, the radio frequency transceiver, or both.

8. The electronic device of claim 1, wherein:
the controller is programmed to generate a synchronization signal supplied to the radio frequency transceiver and the display panel;
the display panel is configured to write each of the plurality of display pixels while the synchronization signal is in a first state; and
the radio frequency transceiver is configured to output electromagnetic waves while the synchronization signal is in a second state.

9. The electronic device of claim 1, wherein:
the display panel is configured to generate a synchronization signal to the radio frequency transceiver, wherein the display panel and the radio frequency transceiver are configured to utilize time division multiplexing (TDM) based on the synchronization signal;

the display panel is configured to write each of the plurality of display pixels while the synchronization signal is in a first state of the time division multiplexing; and the radio frequency transceiver is configured to output electromagnetic waves while the synchronization signal is in a second state of the time division multiplexing.

10. The electronic device of claim 1, wherein:

the radio frequency transceiver is configured to generate a synchronization signal to the display panel, wherein the radio frequency transceiver and the display panel are configured to utilize time division multiplexing (TDM) based on the synchronization signal;

the radio frequency transceiver is configured to write each of the plurality of display pixels while the synchronization signal is in a first state of the time division multiplexing; and the display panel is configured to output electromagnetic waves while the synchronization signal is in a second state of the time division multiplexing.

11. The electronic device of claim 1, wherein:

the display panel is configured to write the first image to the plurality of display pixels while a tearing effect signal is high; and the radio frequency transceiver is configured to:
receive the tearing effect signal; and
output the first electromagnetic waves while the tearing effect signal is low.

12. The electronic device of claim 1, wherein the radio frequency transceiver is configured to:

output the first electromagnetic waves during the first emission period to facilitate detecting presence of an object located within a threshold distance from the electronic device;

output second electromagnetic waves during a second emission period after the first emission period when the presence of the object is detected via the first electromagnetic waves to facilitate determining whether the object comprises a radio frequency transceiver device, wherein duration of the second emission period is greater than the first emission period; and output third electromagnetic waves during a third emission period after the second emission period when the radio frequency transceiver device is detected to facilitate supplying electrical energy from the electronic device to the radio frequency transceiver device that enables the radio frequency transceiver device to wirelessly transmit data back to the electronic device.

13. The electronic device of claim 1, wherein, to determine the first target duration of the first emission period, the controller is programmed to:

determine an operational mode of the radio frequency transceiver; and determine the first target duration of the first emission period based at least in part on the operational mode of the radio frequency transceiver.

14. The electronic device of claim 13, wherein the operational mode comprises an active reader mode, and wherein the controller is programmed to:

determine that the first target duration of the first emission period is a first value when the radio frequency transceiver is operating in an object-detection sub-mode of the active reader mode;

determine that the first target duration of the first emission period is a second value greater than the first value when the radio frequency transceiver is operating in a polling sub-mode of the active reader mode; and determine that the first target duration of the first emission period is a third value greater than the second value when the radio frequency transceiver is operating in a reading sub-mode of the active reader mode.

15. The electronic device of claim 1, wherein, while operating in a passive tag mode, the radio frequency transceiver is configured to:

receive electrical energy via second electromagnetic waves output from an active radio frequency transceiver device; and operate using the electrical energy received from the active radio frequency transceiver device to wirelessly communicate data back to the active radio frequency transceiver device by outputting third electromagnetic waves modulated based at least in part on an analog electrical signal that indicates the data.

16. The electronic device of claim 1, wherein the electronic device comprises a portable phone, a media player, a personal data organizer, a handheld game platform, a tablet device, a computer, or any combination thereof.

17. A method for controlling operation of an electronic device implemented with a near-field communication module and an electronic display, comprising:

determining, using a controller, an operational mode of the near-field communication module;

determining, using the controller, a target duration of an electromagnetic wave emission period based at least in part on the operational mode of the near-field communication module;

determining, using the controller, a target refresh rate to be implemented by the electronic display based at least in part on the target duration of the electromagnetic wave emission period;

determining, using the controller, timing of blanking periods that each occur between successive refresh periods when the electronic display implements the target refresh rate; and instructing, using the controller, the near-field communication module to output electromagnetic waves only during emission periods that each occurs during the blanking periods.

18. The method of claim 17, wherein determining the target duration of the electromagnetic wave emission period comprises:

determining that the target duration of the electromagnetic wave emission period is a first duration when the near-field communication module is in a first operational mode during which the near-field communication module outputs electromagnetic waves to facilitate detecting presence of an object located within a threshold distance from the electronic device;

determining that the target duration of the electromagnetic wave emission period is a second duration greater than the first duration when the near-field communication module is in a second operational mode during which the near-field communication module outputs electromagnetic waves to facilitate detecting whether the object is another near-field communication device; and determining that the target duration of the electromagnetic wave emission period is a third duration greater than the second duration when the near-field communication module is in a third operational mode during which the near-field communication module outputs electromagnetic waves to facilitate supplying electrical energy that the other near-field communication device uses to power wireless transmission of data back to the electronic device.

19. The method of claim 17, wherein determining the target refresh rate comprises:
   determining that the target refresh rate is a first refresh rate when the near-field communication module is in operating in an object-detection mode; and
   determining that the target refresh rate is a second refresh rate greater than the first refresh rate when the near-field communication module is in operating in a polling mode or a reading mode.

20. The method of claim 17, wherein determining the target refresh rate comprises:
   determining that the blanking periods each have a first duration when the electronic display implements a first candidate refresh rate;
   indicating the first candidate refresh rate as the target refresh rate when the first duration of the blanking periods is greater than the target duration of the electromagnetic wave emission period; and
   indicating a second candidate refresh rate lower than the first candidate refresh rate as the target refresh rate when the first duration of the blanking periods is not greater than the target duration of the electromagnetic wave emission period.

21. The method of claim 20, comprising:
   determining, using the controller, that the blanking periods each have a second duration when the electronic display implements the second candidate refresh rate; and
   instructing, using the controller, an image source to output image data corresponding with a black image when the second duration of the blanking periods is not greater than the target duration of the electromagnetic wave emission period.

22. A tangible, non-transitory, computer-readable medium that stores instructions executable by one or more processors of an electronic device, wherein the instructions comprise instructions to:
   instruct, using the one or more processors, the electronic device to generate a tearing effect signal;
   instruct, using the one or more processors, the electronic device to supply the tearing effect signal to an electronic display to enable the electronic display to control refresh timing by refreshing only while the tearing effect signal is in a first state; and
   instruct, using the one or more processors, the electronic device to supply the tearing effect signal to a near-field communication device located within a threshold distance from the electronic display to enable the near-field communication device to control emission timing by outputting electromagnetic waves only while the tearing effect signal is in a second state.

23. The tangible, non-transitory, computer-readable medium of claim 22, wherein the instructions to instruct the electronic device to generate the tearing effect signal comprise instructions to:
   determine a target refresh rate to be implemented by the electronic display; and
   instruct the electronic display to generate the tearing effect signal based at least in part on the target refresh rate, line time implemented in the electronic display, resolution of the electronic display, or any combination thereof.

24. The tangible, non-transitory, computer-readable medium of claim 23, wherein the instructions to determine the target refresh rate comprise instructions to:
   determine an operational mode of the near-field communication device; and
   determine the target refresh rate to be implemented by the electronic display based at least in part on the operational mode of the near-field communication device.

25. The tangible, non-transitory, computer-readable medium of claim 23, wherein the instructions to determine the target refresh rate comprise instructions to:
   determine target duration of an emission period during which the near-field communication device continuously outputs electromagnetic waves; and
   determine the target refresh rate based at least in part on the target duration of the emission period and blanking duration that occurs between successive refresh periods when the electronic display implements the target refresh rate.

* * * * *